(12) United States Patent
Mizuma et al.

(10) Patent No.: US 9,021,742 B2
(45) Date of Patent: May 5, 2015

(54) OPENING AND CLOSING APPARATUS

(71) Applicant: Aisin Seiki Kabushiki Kaisha, Kariya (JP)

(72) Inventors: Kotaro Mizuma, Kariya (JP); Gang Xie, Kariya (JP); Takashi Nakamura, Kariya (JP); Seiichi Sumiya, Kariya (JP); Michihiro Asai, Kariya (JP); Tomio Yasuda, Kasukabe (JP); Kazuhiko Ida, Ryugasaki (JP); Hiroyuki Kishi, Komae (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 14/302,915

(22) Filed: Jun. 12, 2014

(65) Prior Publication Data
US 2014/0366450 A1 Dec. 18, 2014

(30) Foreign Application Priority Data
Jun. 13, 2013 (JP) ................................. 2013-124551

(51) Int. Cl.
| E05F 11/00 | (2006.01) |
| E05F 15/14 | (2006.01) |
| E05F 15/18 | (2006.01) |
| H02K 11/00 | (2006.01) |
| H02J 7/02  | (2006.01) |

(52) U.S. Cl.
CPC ............. *E05F 15/142* (2013.01); *E05F 15/18* (2013.01); *H02K 11/0094* (2013.01); *H02J 7/025* (2013.01)

(58) Field of Classification Search
USPC ....................... 49/360, 358; 296/155
See application file for complete search history.

(56) References Cited

U.S. PATENT DOCUMENTS

| 3,625,328 | A  | * | 12/1971 | Carli ........................ 192/142 R |
| 4,067,144 | A  | * | 1/1978  | Ogishi ........................... 49/360 |
| 4,920,304 | A  | * | 4/1990  | Antonowitz .................. 318/466 |
| 4,983,963 | A  | * | 1/1991  | Hodgetts et al. ............. 340/5.61 |
| 5,127,190 | A  | * | 7/1992  | Hein et al. ....................... 49/31 |
| 6,809,264 | B2 |   | 10/2004 | Watanabe et al. |
| 7,504,788 | B2 | * | 3/2009  | Haab et al. .................... 318/286 |
| 8,484,897 | B2 | * | 7/2013  | Hsieh ............................. 49/199 |

(Continued)

FOREIGN PATENT DOCUMENTS

| JP | 9-117057 A    | 5/1997 |
| JP | 2003-048495 A | 2/2003 |

(Continued)

*Primary Examiner* — Jerry Redman
(74) *Attorney, Agent, or Firm* — Buchanan Ingersoll & Rooney PC

(57) ABSTRACT

An opening and closing apparatus includes: a drive unit provided in an opening and closing body which is openably and closeably attached to a main body, and opening and closing the opening and closing body with respect to the main body by driving the opening and closing body using electric power; a secondary energy storage device provided in the opening and closing body and electrically connected to the drive unit in such a manner that the secondary energy storage device can be inductively charged and can supply electric power to the drive unit; and an electric power receiving coil provided in the opening and closing body so as to be capable of facing an electric power transmitting coil which is provided on the main body, and is electrically connected to a primary energy storage device installed on the main body, and electrically connected to the secondary energy storage device.

9 Claims, 10 Drawing Sheets

(56) References Cited

U.S. PATENT DOCUMENTS

| | | | |
|---|---|---|---|
| 8,572,896 B2* | 11/2013 | Busch | 49/360 |
| 2005/0210752 A1* | 9/2005 | Schulte | 49/360 |
| 2005/0236866 A1* | 10/2005 | Belmond | 296/155 |
| 2007/0234643 A1* | 10/2007 | Siegal et al. | 49/360 |
| 2007/0279002 A1* | 12/2007 | Partovi | 320/115 |
| 2009/0211160 A1* | 8/2009 | Tehranchi | 49/360 |
| 2013/0214099 A1 | 8/2013 | Okumura | |
| 2014/0210403 A1* | 7/2014 | Lin | 320/108 |

FOREIGN PATENT DOCUMENTS

| | | |
|---|---|---|
| JP | 2003-082927 A | 3/2003 |
| JP | 2012-096682 A | 5/2012 |

* cited by examiner

OPENING AND CLOSING APPARATUS

CROSS REFERENCE TO RELATED APPLICATIONS

This application is based on and claims priority under 35 U.S.C. §119 to Japanese Patent Application 2013-124551, filed on Jun. 13, 2013, the entire contents of which are incorporated herein by reference.

TECHNICAL FIELD

This disclosure relates to an opening and closing apparatus that is provided so as to be openable and closeable with respect to a main body.

BACKGROUND DISCUSSION

In the recent years, the number of vehicles has increased which are equipped with an electric sliding door apparatus that automatically opens and closes a door opening of the vehicle using electric power. The electric sliding door apparatus includes a sliding door (an opening and closing body) that is attached to a vehicle body (a main body) so as to be slidable (openable and closeable) in a longitudinal direction of the vehicle, and a sliding door driving unit (a drive unit) that slides (opens and closes) the sliding door in the longitudinal direction of the vehicle using electric power. Typically, electric power is supplied to the sliding door driving unit from an in-vehicle energy storage device mounted on the vehicle body.

When the sliding door driving unit is provided in the sliding door, an electric power supply unit is provided so as to electrically connect the in-vehicle energy storage device and the sliding door driving unit, and to supply electric power from the in-vehicle energy storage device to the sliding door driving unit. A shape or a structure of the electric power supply unit is proposed in various forms.

JP 2012-96682A (Reference 1) discloses the electric power supply unit that has a flat cable which electrically connects the in-vehicle energy storage device provided on the vehicle body and the sliding door driving unit provided in the sliding door; a vehicle body-side attachment portion that supports a portion of the flat cable which is mounted on the vehicle body; and a door-side attachment portion that supports a portion of the flat cable which is mounted on the sliding door. Each attachment portion supports the flat cable in such a manner that a longitudinal axis of the flat cable is inclined at a predetermined angle relative to a horizontal plane. In doing so, it is possible to reduce the size and weight of the electric power supply unit.

JP 2003-48495A (Reference 2) discloses the electric power supply unit in which wire harnesses are accommodated in a protector to electrically connect the in-vehicle energy storage device mounted on the vehicle body and the sliding door driving unit provided in the sliding door. A substantially annular wall portion is formed in the protector, and auxiliary devices such as an electric motor and the like are accommodated on the inside of the wall portion. The auxiliary devices are connected to end portions of the wire harnesses. In this configuration, not only is a dead space in the protector effectively used, but also the degree of freedom of disposition of the auxiliary devices and the like improves.

The electric power supply unit disclosed in JP 2012-96682A (Reference 1) has a problem in that it takes time and labor to incline the flat cable at the set angle, and thus productivity decreases. Each electric power supply unit disclosed in JP 2012-96682A (Reference 1) and JP 2003-48495A (Reference 2) is configured to connect the vehicle body and the sliding door using the cable. Accordingly, there is a problem in that it is necessary to prepare a solution for the routing of the cable, and in that when a length of the cable is large, electric resistance increases causing a voltage drop during the electric power supply.

SUMMARY

Thus, a need exists for an opening and closing apparatus which is not susceptible to the drawback mentioned above.

An aspect of this disclosure is directed to an opening and closing apparatus including: a drive unit that is provided in an opening and closing body which is openably and closeably attached to a main body, and that opens and closes the opening and closing body with respect to the main body by driving the opening and closing body using electric power; a secondary energy storage device that is provided in the opening and closing body and is electrically connected to the drive unit in such a manner that the secondary energy storage device can be inductively charged and can supply electric power to the drive unit; and an electric power receiving coil that is provided in the opening and closing body so as to be capable of facing an electric power transmitting coil which is provided on the main body, and is electrically connected to a primary energy storage device installed on the main body, and that is electrically connected to the secondary energy storage device. In this case, the opening and closing apparatus according to the aspect of this disclosure preferably includes a control apparatus which controls the secondary energy storage device in such a manner that the secondary energy storage device is inductively charged with electric power of the primary energy storage device via the electric power transmitting coil and the electric power receiving coil when the electric power transmitting coil faces the electric power receiving coil.

According to the aspect of this disclosure, the opening and closing apparatus is configured in such a manner that the secondary energy storage device in the opening and closing body is inductively charged with electric power from the primary energy storage device when the electric power transmitting coil, which is electrically connected to the primary energy storage device disposed on the main body, faces the electric power receiving coil disposed on the opening and closing body. Accordingly, electric power of the secondary energy storage device is supplied to the drive unit provided in the opening and closing body to thereby drive the opening and closing body.

That is, according to the aspect of this disclosure, the drive unit in the opening and closing body is driven by electric power from the secondary energy storage device installed in the opening and closing body, and thus it is not necessary to provide a cable between the main body and the opening and closing body so as to supply electric power to the drive unit. Furthermore, since the secondary energy storage device is inductively charged with electric power from the primary energy storage device, it is not necessary to provide a cable between the main body and the opening and closing body so as to charge the secondary energy storage device. Accordingly, it is possible to provide the opening and closing apparatus that can solve problems occurring when the main body is connected to the opening and closing body via a cable. Furthermore, according to this configuration, it is possible to manufacture and sell the opening and closing apparatus in which the opening and closing body, the drive unit, and the secondary energy storage device are integrated together.

According to the aspect of this disclosure, since the secondary energy storage device is inductively charged when the electric power transmitting coil of the main body faces the electric power receiving coil of the opening and closing body, it is necessary to provide both coils at respective positions in which both coils can face each other. In this case, when the opening and closing body is fully closed, the electric power transmitting coil may be provided so as to face the electric power receiving coil. Accordingly, when the opening and closing body is present at or in the vicinity of a fully closed position, the secondary energy storage device can be inductively charged.

Another aspect of this disclosure is directed to a opening and closing apparatus including: a drive unit that is configured to be provided in an opening and closing body which is openably and closeably attached to a main body, and that is configured to open and close the opening and closing body with respect to the main body by driving the opening and closing body using electric power; a secondary energy storage device that is configured to be provided in the opening and closing body and that is electrically connected to the drive unit in such a manner that the secondary energy storage device can be inductively charged and can supply electric power to the drive unit; and an electric power receiving coil that is provided in the opening and closing body so as to be capable of facing an electric power transmitting coil which is configured to be provided on the main body and be electrically connected to a primary energy storage device configured to be installed on the main body, and that is electrically connected to the secondary energy storage device.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments disclosed here will be described with reference to the accompanying drawings.

First Embodiment

Figure 1:
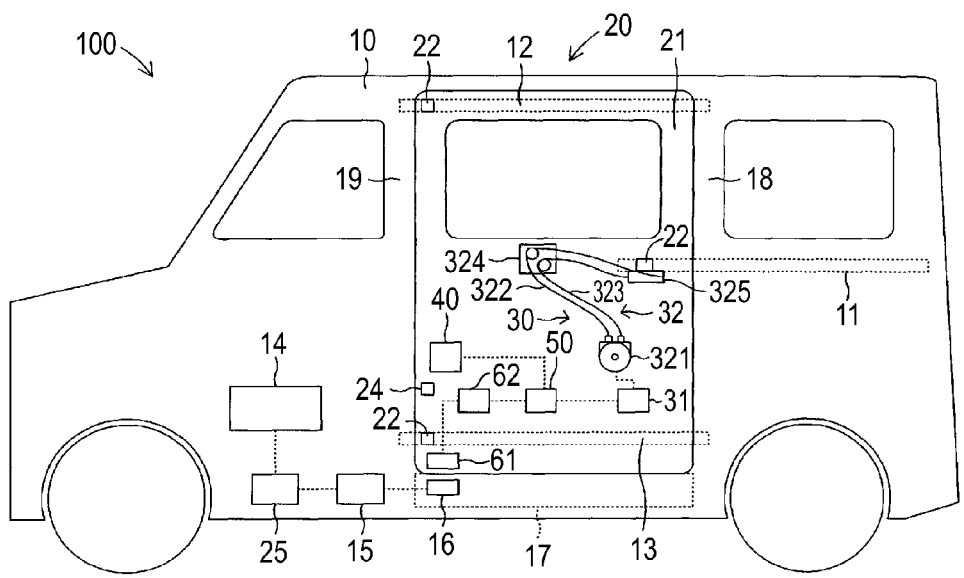
FIG. 1 is a schematic side view of a vehicle equipped with an electric sliding door apparatus according to First Embodiment.
Figure 2:
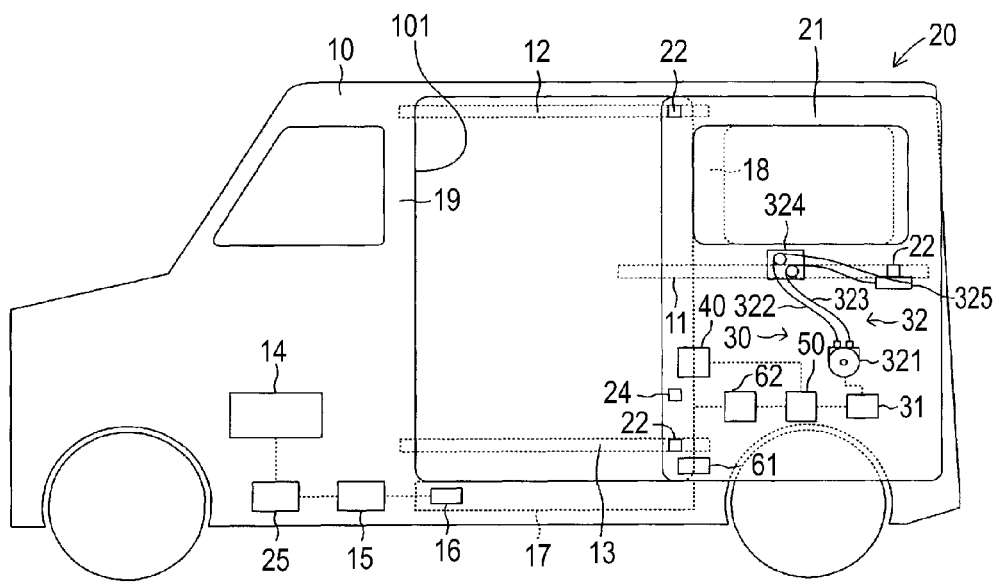
FIG. 2 is another schematic side view of the vehicle equipped with the electric sliding door apparatus according to First Embodiment.

FIGS. 1 and 2 are schematic side views of a vehicle equipped with an electric sliding door apparatus as an opening and closing apparatus according to First Embodiment. A vehicle 100 includes a vehicle body (a main body) 10 and an electric sliding door apparatus (an opening and closing apparatus) 20. The electric sliding door apparatus 20 is configured to include a sliding door (an opening and closing body) 21; a sliding door driving unit (a drive unit) 30; a door control apparatus (a control apparatus) 40; a door built-in energy storage device (a secondary energy storage device) 50; and an electric power receiving coil 61. The sliding door 21 illustrated in FIGS. 1 and 2 opens and closes a door opening 101 (refer to FIG. 2) that is formed in a left portion of the vehicle body 10. FIG. 1 is a view illustrating a state (a fully closed state) where the door opening 101 is fully closed by the sliding door 21, and FIG. 2 is a view illustrating a state (a fully open state) where the door opening 101 is open at the maximum position. In the fully closed state, the sliding door 21 is fixed at a fully closed position by a fully-closed door lock apparatus which is not illustrated, and thus the fully closed state is maintained. In the fully open state, the sliding door 21 is fixed at a fully open position by a fully-open door lock apparatus which is not illustrated, and thus the fully open state is maintained. When a position of the sliding door 21 is in the fully closed state, it is referred to as the fully closed position, and when a position of the sliding door 21 is in the fully open state, it is referred to as the fully open position.

As illustrated in FIGS. 1 and 2, the vehicle body 10 includes a foot panel 17 that is provided directly below the door opening 101. The foot panel 17 has a hollow inner portion. The foot panel 17 is referred to as a foot step, and an occupant gets on and off the vehicle using the foot panel 17 as a step. The vehicle body 10 includes a C pillar 18 that is provided in back of the door opening 101 in the vehicle, and a B pillar 19 that is provided in front of the door opening 101 in the vehicle. The C pillar 18 forms a part of a rear edge of the door opening 101 in the vehicle, and the B pillar 19 forms a part of a front edge of the door opening 101 in the vehicle. As illustrated in FIG. 1, when the sliding door 21 is fully closed, the C pillar 18 faces a rear portion of the sliding door 21 from the rear, and the B pillar 19 faces a front portion of the sliding door 21 from the front. In contrast, as illustrated in FIG. 2, when the sliding door 21 is fully open, the C pillar 18 roughly faces the front portion of the sliding door 21.

A center guide rail 11, an upper guide rail 12, and a lower guide rail 13 are provided in the side portion of the vehicle body 10. The upper guide rail 12 is provided in an upper portion of the door opening 101 so as to extend in a longitudinal direction (a lateral direction in FIGS. 1 and 2) of the vehicle in such a manner that the upper guide rail 12 crosses over the door opening 101 in the longitudinal direction of the vehicle. The lower guide rail 13 is provided in a lower portion of the door opening 101 so as to extend in the longitudinal direction of the vehicle in such a manner that the lower guide rail 13 crosses over the door opening 101 in the longitudinal direction. The center guide rail 11 is provided in the vicinity of a center position in a vertical direction of the door opening 101 so as to extend in the longitudinal direction of the vehicle from the rear portion of the door opening 101 toward the rear.

Guide roller units 22 are attached to the sliding door 21, and are slidably guided by the guide rails 11, 12, and 13, respectively. The guide roller units 22 slide relative to the guide rails 11, 12, and 13, respectively, and thus the sliding door 21 is guided by the guide rails 11, 12, and 13. For this reason, the sliding door 21 is supported by the vehicle body 10 so as to be slidable along the longitudinal direction of the vehicle. The sliding door 21 is slidably attached to the vehicle body 10 in such a manner that an open and closed state of the door opening 101 changes from the fully closed state to the fully open state when the sliding door 21 moves in a sliding manner toward the rear of the vehicle with respect to the vehicle body 10.

For example, an inner panel and an outer panel overlap each other to form the sliding door 21 with an inner space. The following are provided inside the sliding door 21: the sliding door driving unit 30, the door control apparatus 40, the door built-in energy storage device 50, and the electric power receiving coil 61. The sliding door driving unit 30 includes an electric motor 31 and a power transmission mechanism 32. In the embodiment, the power transmission mechanism 32 has a rotary drum 321, two wires 322 and 323, a fixed pulley unit 324, and a movable pulley unit 325. The rotary drum 321 is driven to rotate by the electric motor 31. One end of each of the two wires 322 and 323 is fixed to the rotary drum 321. The wire 322 is drawn from the rotary drum 321 so as to be wound around the movable pulley unit 325 via the fixed pulley unit 324, and the other end of the wire 322 is fixed to an front end of the center guide rail 11 on the vehicle body 10. The wire 323 is drawn from the rotary drum 321 so as to be wound around the movable pulley unit 325 via the fixed pulley unit 324, and the other end of the wire 323 is fixed to a rear end of the center guide rail 11 on the vehicle body 10. The movable pulley unit 325 is fixed to the guide roller unit 22 that is guided by the center guide rail 11.

The electric motor 31 is rotatable in both clockwise and counter-clockwise directions, and is driven when electric power is supplied thereto. When a driving force of the electric motor 31 rotates the rotary drum 321 in one direction, the wire 323 is wounded around the rotary drum 321, and the wire 322 is drawn from the rotary drum 321. For this reason, the movable pulley unit 325 moves toward the rear of the vehicle. When the movable pulley unit 325 moves toward the rear of the vehicle, the sliding door 21 undergoes an opening operation. In contrast, when a driving force of the electric motor 31 rotates the rotary drum 321 in the other direction, the wire 323 is drawn from the rotary drum 321, and the wire 322 is wound around the rotary drum 321. For this reason, the movable pulley unit 325 moves toward the front of the vehicle. When the movable pulley unit 325 moves toward the front of the vehicle, the sliding door 21 undergoes a closing operation.

In a case where the sliding door driving unit is provided in the sliding door, JP 2003-82927A describes an opening and closing operation of the sliding door in detail, and thus it is suggested that JP 2003-82897A be referenced for more details.

The door built-in energy storage device 50 provided in the sliding door 21 is electrically connected to the electric motor 31 in such a manner that electric power can be supplied to the electric motor 31. In addition, the door built-in energy storage device 50 is electrically connected to the door control apparatus 40 in such a manner that electric power can be supplied to the door control apparatus 40. The descriptions of other various actuators are omitted from this specification, but can be assumed to be built into the sliding door. For example, the following can be built into the sliding door: a door lock actuator for driving of a door lock apparatus that locks and unlocks the sliding door; a window regulator actuator for the opening and closing of door glass that is attached to the sliding door; and the like. The door built-in energy storage device 50 may be configured in such a manner that electric power can be supplied to the actuators.

The door built-in energy storage device 50 is not limited insofar as being chargeable. A capacitor or a lithium ion battery is illustrated as an example of the door built-in energy storage device 50. When electric capacity of the door built-in energy storage device 50 is excessively small, it is necessary to frequently charge the door built-in energy storage device 50, and convenience deteriorates. In addition, excessively large electric capacity is not preferred from the viewpoint of safety. Accordingly, the electric capacity of the door built-in energy storage device 50 is preferably set to an appropriate size. A capacitor is used as being suitable for the door built-in energy storage device 50.

The door control apparatus 40 controls discharge of the door built-in energy storage device 50 to control an operation of the sliding door driving unit 30 or operations of the other actuators. In addition, the door control apparatus 40 controls charging of the door built-in energy storage device 50.

An in-vehicle energy storage device (a primary energy storage device) 14 is mounted on the vehicle body 10. The in-vehicle energy storage device 14 is electrically connected to an electric power transmitting coil 16 via a boosting DC/DC converter 25 and a high-frequency inverter 15. The electric power transmitting coil 16 is provided in the foot panel 17 that is provided directly below the sliding door 21 (directly below the door opening 101). As well illustrated in FIG. 1, an electric power receiving coil 61 is provided in an inner lower portion of the sliding door 21 in such a manner that the electric power receiving coil 61 faces the electric power transmitting coil 16 when the sliding door 21 is fully closed. The electric power receiving coil 61 is electrically connected to the door built-in energy storage device 50 via a rectifier 62 that is provided in the sliding door 21.

When the electric power transmitting coil 16 is electrically energized in a state where the electric power transmitting coil 16 and the electric power receiving coil 61 face each other, magnetic fluxes occurring in the electric power transmitting coil 16 pass through the electric power receiving coil 61, and thus a current flows through the electric power receiving coil 61. Electric power energized in the electric power transmitting coil 16 is transmitted to the electric power receiving coil 61 by electromagnetic induction. In addition, the electric power transmitted to the electric power receiving coil 61 is supplied to the door built-in energy storage device 50. In doing so, the door built-in energy storage device 50 can be inductively charged with electric power from the in-vehicle energy storage device 14. The electric motor 31 can be driven by the electric power that is charged from the in-vehicle energy storage device 14 to the door built-in energy storage device 50.

Figure 3:
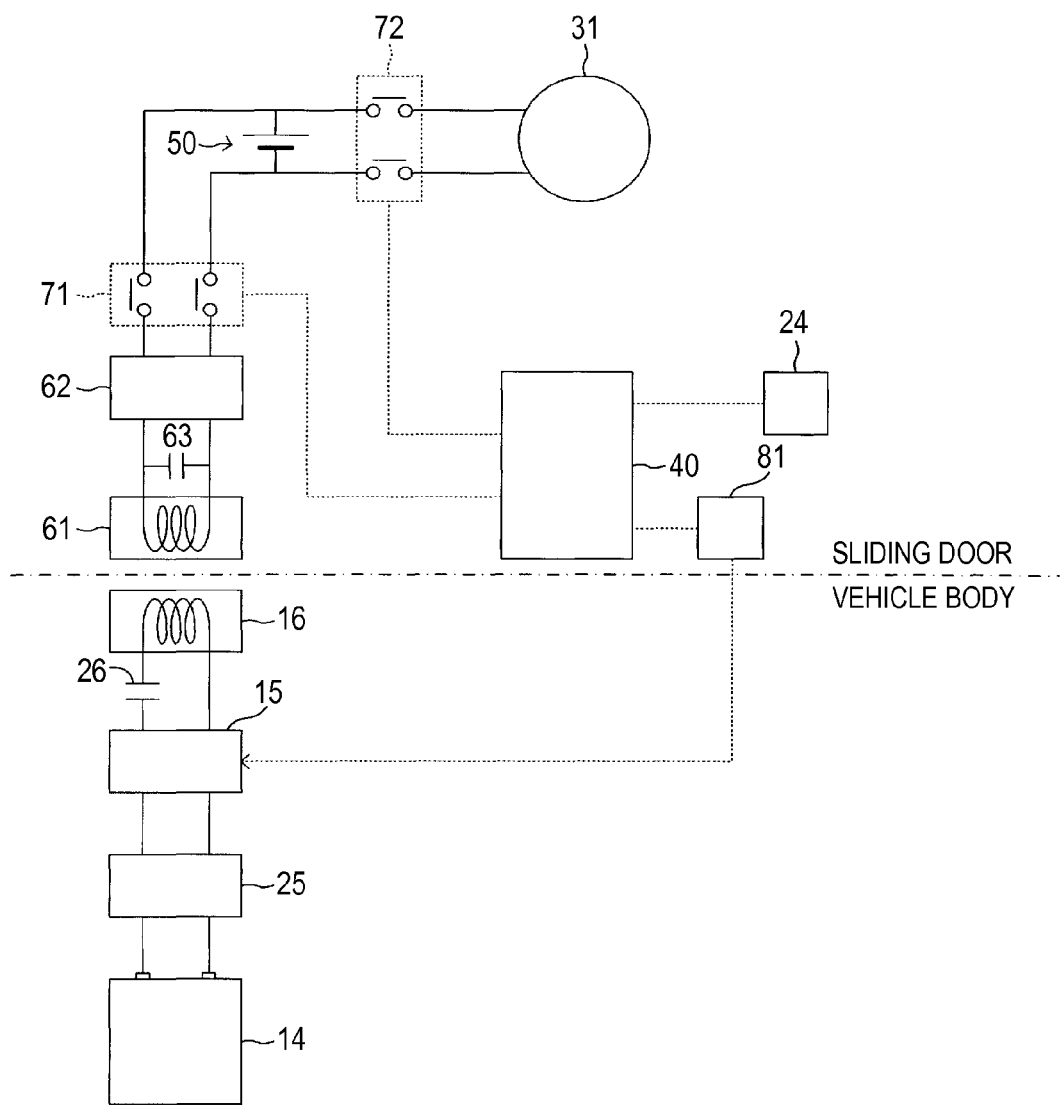
FIG. 3 is a view illustrating electric connections between an in-vehicle energy storage device and an electric motor.

FIG. 3 is a view illustrating electric connections between the in-vehicle energy storage device 14 and the electric motor 31. As illustrated in FIG. 3, the in-vehicle energy storage device 14 is connected to the boosting DC/DC converter 25 on the vehicle body. The boosting DC/DC converter 25 boosts a voltage of the in-vehicle energy storage device 14 so as to reduce voltage fluctuation of the in-vehicle energy storage device 14 or improve copper loss of the electric power receiving coil 61, and thus improves charging efficiency. The boosting DC/DC converter 25 is connected to the high-frequency inverter 15. For example, the high-frequency inverter 15 is a full bridge inverter that has four combinations of a switch and a feedback diode, and converts a boosted direct current to an alternating current of predetermined voltage. The high-frequency inverter 15 is connected to the electric power transmitting coil 16. Accordingly, the alternating current converted in the high-frequency inverter 15 flows through the electric power transmitting coil 16. As illustrated in FIG. 3, a series resonance capacitor 26 is provided in an electric power supply line between the high-frequency inverter 15 and the electric power transmitting coil 16.

In contrast, the electric power receiving coil 61 is connected to the rectifier 62 in the sliding door. The rectifier 62 converts an alternating current generated in the electric power receiving coil 61 to a direct current. The rectifier 62 is connected to the door built-in energy storage device 50. Accordingly, the door built-in energy storage device 50 is charged with the direct current converted in the rectifier 62. A first relay 71 is interposed between the rectifier 62 and the door built-in energy storage device 50. The first relay 71 is controlled to be turned on and off. When the first relay 71 is turned on, the electric power receiving coil 61 and the door built-in energy storage device 50 are electrically connected to each other. When the first relay 71 is turned off, the electric power receiving coil 61 and the door built-in energy storage device 50 are electrically disconnected from each other. As illustrated in FIG. 3, a parallel resonance capacitor 63 is provided between electric supply lines (between terminals of the electric power receiving coil 61) that connect the electric power receiving coil 61 and the rectifier 62. When the series resonance capacitor 26 provided on the electric power transmitting coil 16 side is turned on, and the parallel resonance capacitor 63 provided on the electric power receiving coil 61 side is turned on, an electric power supply transformer illustrated in FIG. 3 can be equivalent to an ideal transformer by selection of the capacity of each capacitor. For this reason, a inductive charging circuit is readily designed.

The door built-in energy storage device 50 is electrically connected to the electric motor 31. In the embodiment, the electric motor 31 is a DC motor. A second relay 72 is interposed between the door built-in energy storage device 50 and the electric motor 31. The second relay 72 is controlled to be turned on and off. When the second relay 72 is turned on, the door built-in energy storage device 50 and the electric motor 31 are electrically connected to each other. When the second relay 72 is turned off, the door built-in energy storage device 50 and the electric motor 31 are electrically disconnected from each other. The first relay 71 and the second relay 72 are electrically connected to the door control apparatus 40, and an operation of each relay is controlled by the door control apparatus 40.

As illustrated in FIG. 1, a position detection sensor 24 is provided in the sliding door 21 so as to detect a position of the sliding door 21 in the longitudinal direction of the vehicle. As illustrated in FIG. 3, the position detection sensor 24 is electrically connected to the door control apparatus 40, and inputs detected information to the door control apparatus 40.

Figure 4:
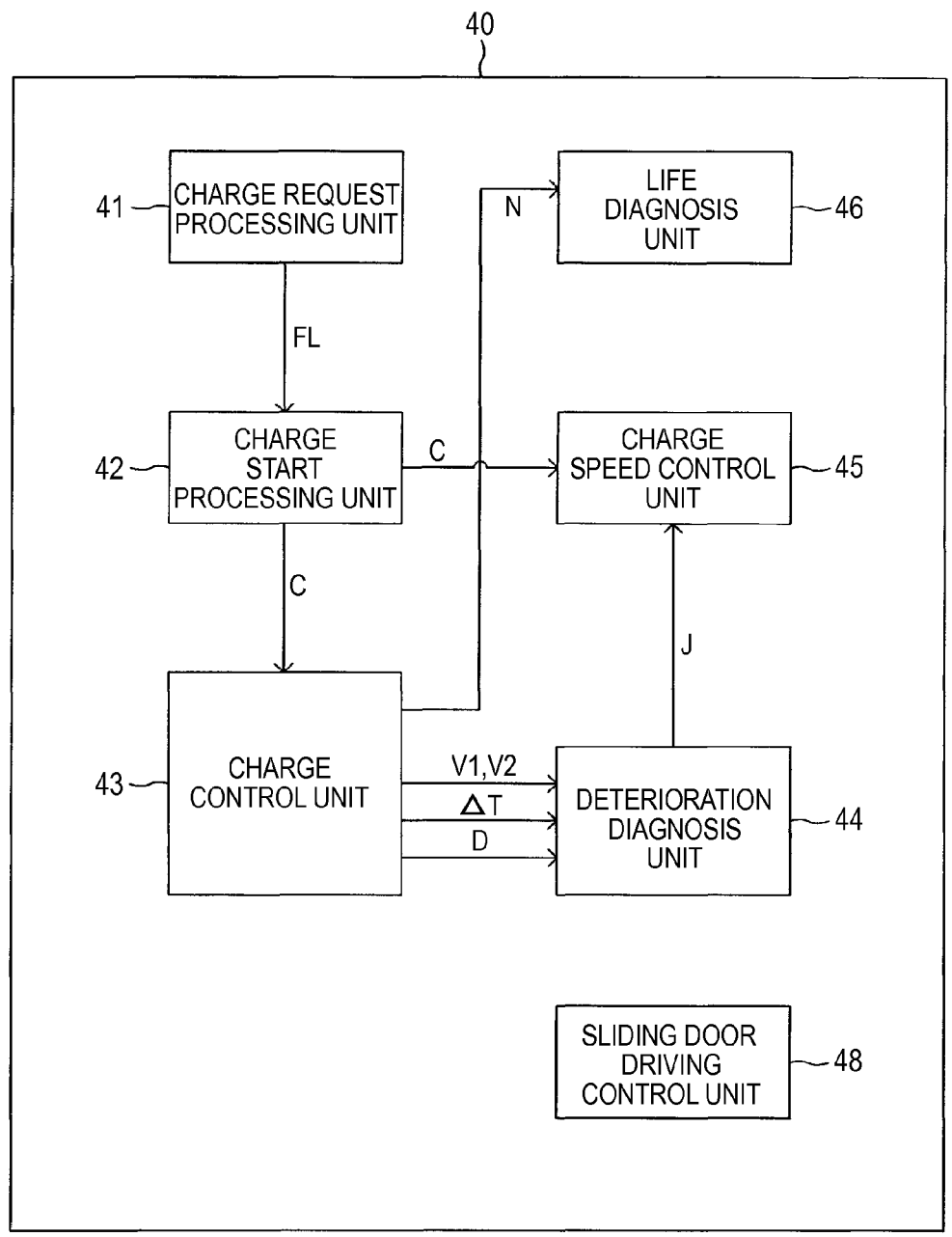
FIG. 4 is a block diagram illustrating functions related to the charging of a door built-in energy storage device among functions of a door control apparatus.

The door control apparatus 40 is formed of a micro computer that has a CPU, a ROM, a RAM, and the like. FIG. 4 is a block diagram illustrating functions related to the charging and discharging of the door built-in energy storage device 50 among functions of the door control apparatus 40. As illustrated in FIG. 4, the door control apparatus 40 has a charge request processing unit 41, a charge start processing unit 42, a charge control unit 43, a deterioration diagnosis unit 44, a charge speed control unit 45, a life diagnosis unit 46, and a sliding door driving control unit 48. The charge request processing unit 41 determines whether it is necessary to charge the door built-in energy storage device 50. The charge start processing unit 42 determines the start time of charging of the door built-in energy storage device 50. The charge control unit 43 controls the charging of the door built-in energy storage device 50. The deterioration diagnosis unit 44 diagnoses deterioration of the door built-in energy storage device 50. The charge speed control unit 45 controls a charge speed (a charge current) when the door built-in energy storage device 50 is charged. The life diagnosis unit 46 diagnoses the life of the door built-in energy storage device 50 based on the frequency of charge. The sliding door driving control unit 48 controls the second relay 72.

Figure 5:
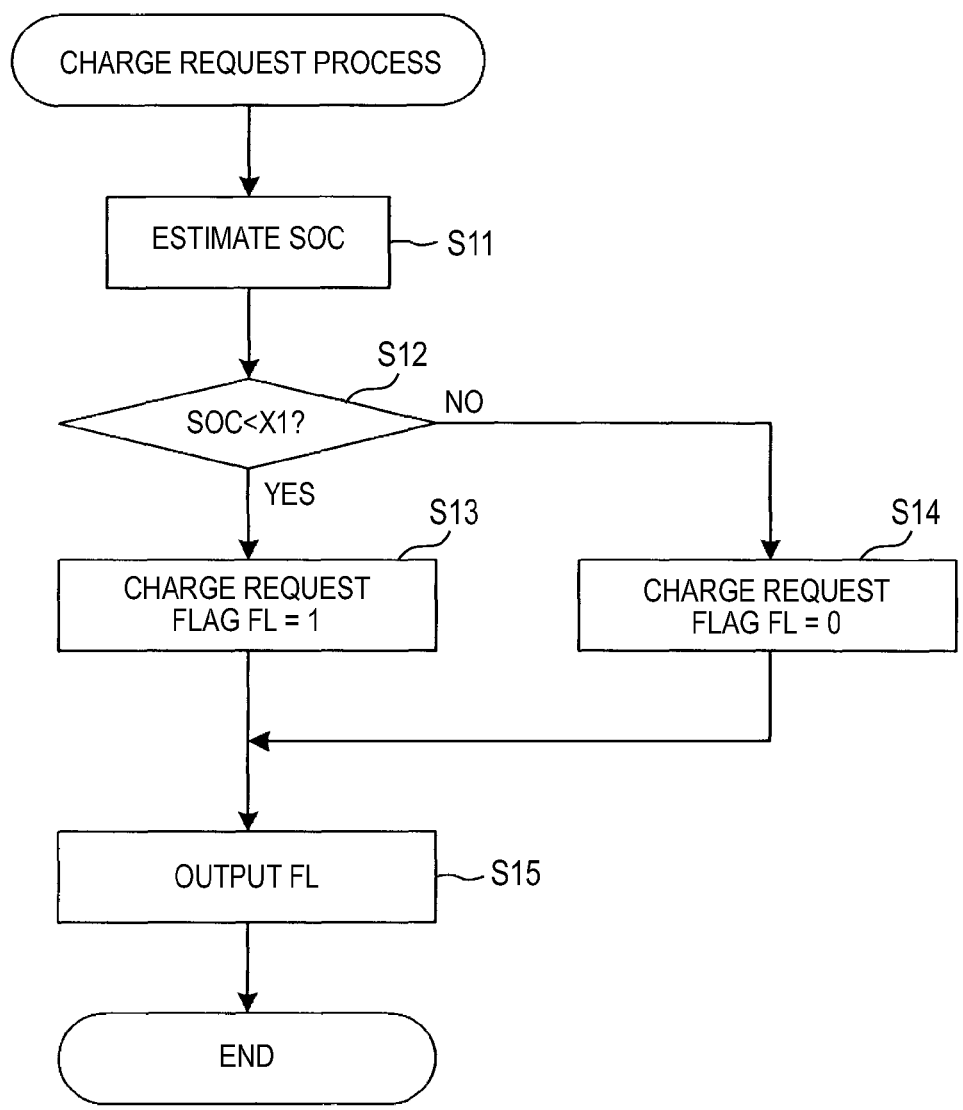
FIG. 5 is a flow chart illustrating a charge request processing routine executed by a charge request processing unit of the door control apparatus.

Subsequently, the following description is relative to control of the charging and discharging of the door built-in energy storage device 50 by the door control apparatus 40. FIG. 5 is a flow chart illustrating a charge request processing routine executed by the charge request processing unit 41 of the door control apparatus 40. The routine is repeatedly executed at predetermined fine time intervals after an ignition switch of the vehicle is turned on. When the charge request processing routine is initiated, first, the charge request processing unit 41 estimates a state of charge (SOC) of the door built-in energy storage device 50 in step S11 (hereinafter, step is abbreviated as S) illustrated in FIG. 5. In this case, for example, the charge request processing unit 41 measures a terminal voltage of the door built-in energy storage device 50, and estimates a state of charge (a charging rate) based on the measured terminal voltage. Subsequently, the charge request processing unit 41 determines whether the estimated state of charge is less than a first state of charge X1 (for example, 90%) (S12). The first state of charge X1 is determined in advance as a state of charge in which it is determined that it is necessary to charge the door built-in energy storage device 50. When a state of charge is less than the first state of charge X1 (S12: Yes), the charge request processing unit 41 sets a charge request flag FL to 1 (S13). In contrast, when the estimated state of charge is greater than or equal to the first state of charge X1 (S12: No), the charge request processing unit 41 sets the charge request flag FL to 0 (S14). The charge request flag FL is intended to indicate whether it is necessary to charge the door built-in energy storage device 50. The fact that the charging is necessary is indicated by the setting of the charge request flag FL to 1. The fact that the charging is not necessary is indicated by the setting of the charge request flag FL to 0. The charge request processing unit 41 sets the charge request flag FL in S13 or S14, and then outputs the set charge request flag FL to the charge start processing unit 42. Thereafter, the charge request processing unit 41 finishes the routine. When a state of charge of the door built-in energy storage device 50 is less than the first state of charge X1, a charge request is output to the charge start processing unit 42 by the execution of the charge request processing routine.

Figure 6:
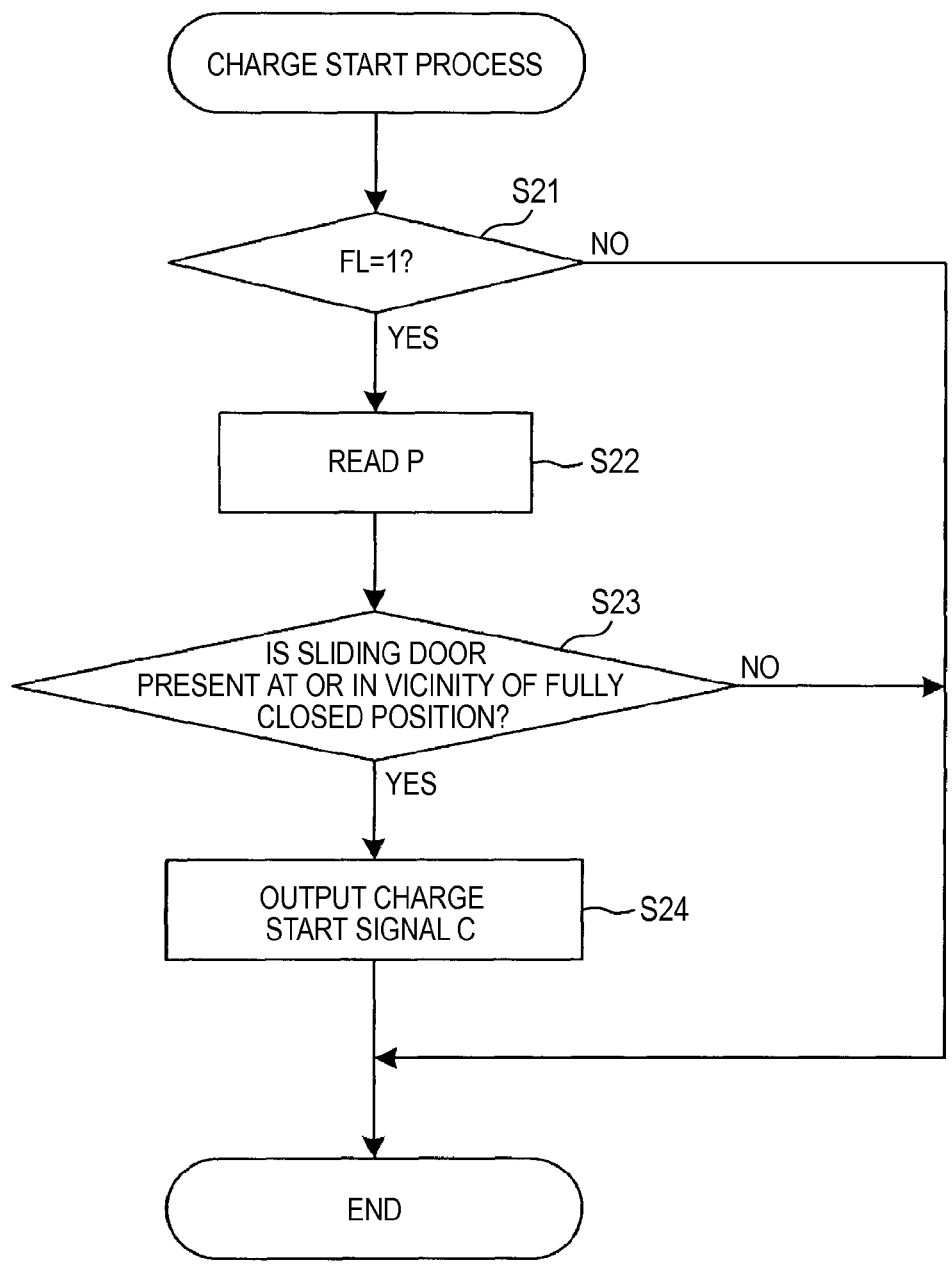
FIG. 6 is a flow chart illustrating a charge start processing routine executed by a charge start processing unit of the door control apparatus.

FIG. 6 is a flow chart illustrating a charge start processing routine executed by the charge start processing unit 42 of the door control apparatus 40. When the charge start processing routine is initiated, first, the charge start processing unit 42 determines whether the charge request flag FL input from the charge request processing unit 41 is set to 1 in S21 illustrated in FIG. 6. When the charge request flag FL is set to 0 (S21: No), the charge start processing unit 42 finishes the routine. In contrast, when the charge request flag FL is set to 1 (S21: Yes), the charge start processing unit 42 transfers the process to S22, and reads position information P of the sliding door 21, which is input from the position detection sensor 24. Subsequently, the charge start processing unit 42 determines whether the sliding door 21 is present at or in the vicinity of the fully closed position based on the read position information P (S23). For example, a "position in the vicinity of the fully closed position" is a position between the fully closed position and a half-closed door position (for example, a position at which a half latch hook of the fully-closed door lock apparatus is engaged with a ratchet). When the sliding door 21 is not present at or in the vicinity of the fully closed position (S23: No), the charge start processing unit 42 finishes the routine. In contrast, when the sliding door 21 is present at or in the vicinity of the fully closed position (S23: Yes), the charge start processing unit 42 outputs a charge start signal C to the charge control unit 43 and the charge speed control unit 45. Thereafter, the charge start processing unit 42 finishes the routine. Since the charge start processing routine is executed, the charge request flag FL is set to 1. In addition, when the sliding door 21 is present at or in the vicinity of the fully closed position, the charge start processing unit 42 outputs the charge start signal C to the charge control unit 43 and the charge speed control unit 45.

Figure 7:
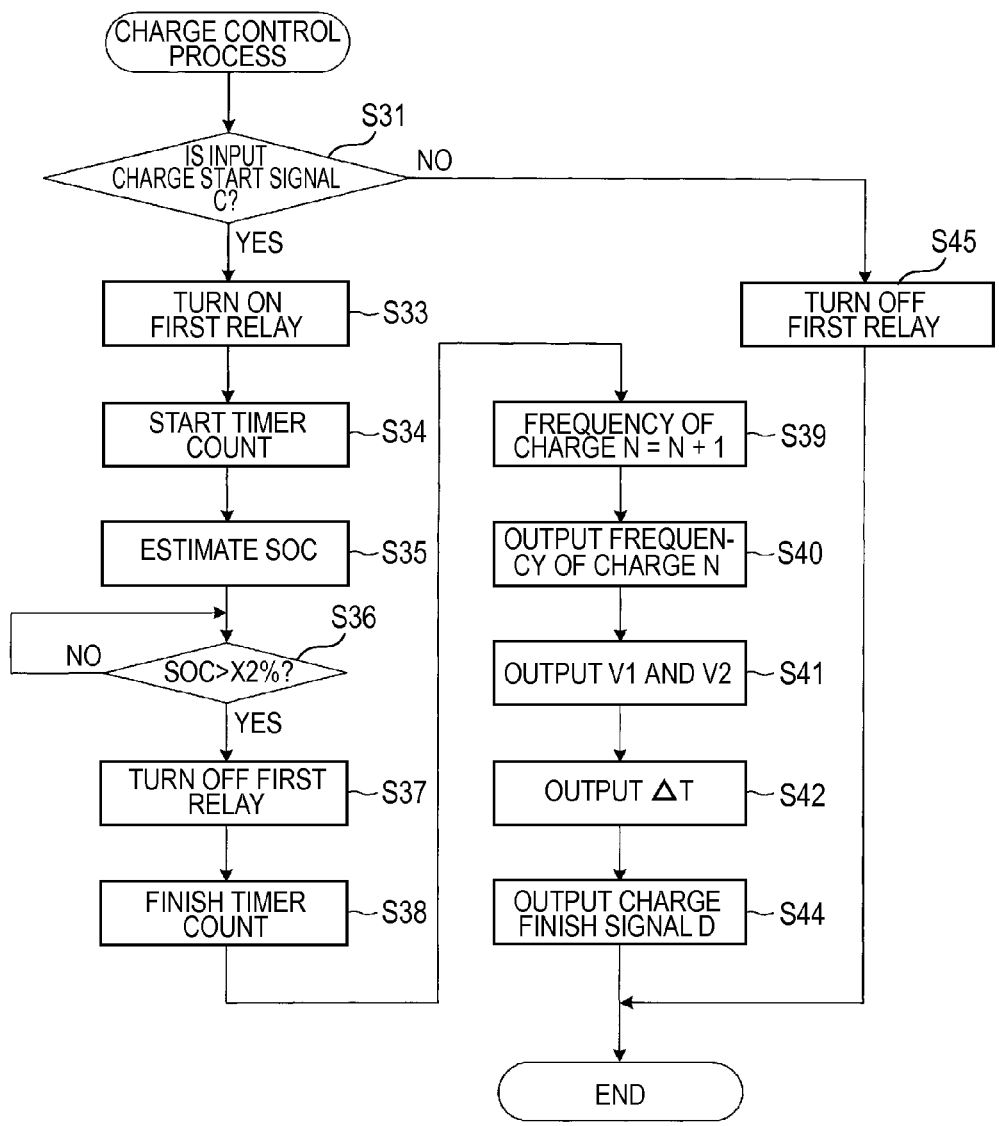
FIG. 7 is a flow chart illustrating a charge control processing routine executed by a charge control unit of the door control apparatus.

FIG. 7 is a flow chart illustrating a charge control processing routine executed by the charge control unit 43 of the door control apparatus 40. When the charge control processing routine is initiated, first, the charge control unit 43 determines whether the charge start signal C is input to the charge control unit 43 from the charge start processing unit 42 in S31 in FIG. 7. When the charge start signal C is not input to the charge control unit 43 (S31: No), the charge control unit 43 transfers the process to S45, and outputs an OFF signal to the first relay 71.

When it is determined that the charge start signal C is input to the charge control unit 43 from the charge start processing unit 42 in S31 (S31: Yes), the charge control unit 43 outputs an ON signal to the first relay 71 (S33). Accordingly, the first relay 71 is turned on, the electric power receiving coil 61 and the door built-in energy storage device 50 are electrically connected to each other via the rectifier 62.

When the first relay 71 is turned on in S33, and thus electrical connection is established between the electric power receiving coil 61 and the door built-in energy storage device 50, the door built-in energy storage device 50 is charged with electric power from the in-vehicle energy storage device 14. Specifically, a direct current from the in-vehicle energy storage device 14 is boosted by the boosting DC/DC converter 25, and the high-frequency inverter 15 converts the boosted direct current to an alternating current. The converted alternating current flows through the electric power transmitting coil 16. The alternating current flows through the electric power transmitting coil 16 to thereby causing magnetic fluxes to occur, and the magnetic fluxes flow through the electric power receiving coil 61 to thereby cause an alternating current to flow through the electric power receiving coil 61. That is, the alternating current is transmitted to the electric power receiving coil 61. The alternating current transmitted to the electric power receiving coil 61 is converted to a direct current by the rectifier 62, and then the converted direct current is supplied to the door built-in energy storage device 50. In this manner, the door built-in energy storage device 50 can be inductively charged with electric power from the in-vehicle energy storage device 14.

The charge control unit 43 outputs an ON signal to the first relay 71, and then starts a time duration measurement by a timer T (S34). Subsequently, the charge control unit 43 estimates a state of charge of the door built-in energy storage device 50 based on a terminal voltage or the like of the door built-in energy storage device 50 (S35), and determines whether the estimated state of charge is greater than a second state of charge X2 (>X1 and for example, 99%) (S36). The second state of charge X2 is determined in advance as a state of charge in which it is determined that the charging of the door built-in energy storage device 50 is completed. The determination is repeated while a state of charge estimated in S35 is less than or equal to the second state of charge X2. The amount of charge of the door built-in energy storage device 50 increases as the charging thereof makes progress. When a state of charge exceeds the second state of charge X2 (S36: Yes), the charge control unit 43 outputs an OFF signal to the first relay 71 (S37). Accordingly, the first relay 71 is turned off to thereby shut off an electrical connection that is formed between the electric power receiving coil 61 and the door built-in energy storage device 50 via the rectifier 62. For this reason, the charging of the door built-in energy storage device 50 is finished.

Subsequently, the charge control unit 43 finishes a time duration measurement by the timer T (S38), and increments the frequency of charge N (S39). Subsequently, the charge control unit 43 outputs the incremented frequency of charge N to the life diagnosis unit 46 (S40). Subsequently, the charge control unit 43 outputs the following voltages to the deterioration diagnosis unit 44 (S41): a voltage (a charge start voltage) V1 between the terminals of the door built-in energy storage device 50 at the start of charge, and a voltage (a charge finish voltage) V2 between the terminals of the door built-in energy storage device 50 at the finish of charge. Subsequently, the charge control unit 43 outputs to the deterioration diagnosis unit 44 a period of time from the start of charge to the finish of charge (a period of charge time ΔT) (S42). Subsequently, the charge control unit 43 outputs a charge finish signal D to the deterioration diagnosis unit 44 (S44). Thereafter, the charge control unit 43 finishes the routine. The execution of the charge control processing routine controls charging from the in-vehicle energy storage device 14 to the door built-in energy storage device 50.

Figure 8:
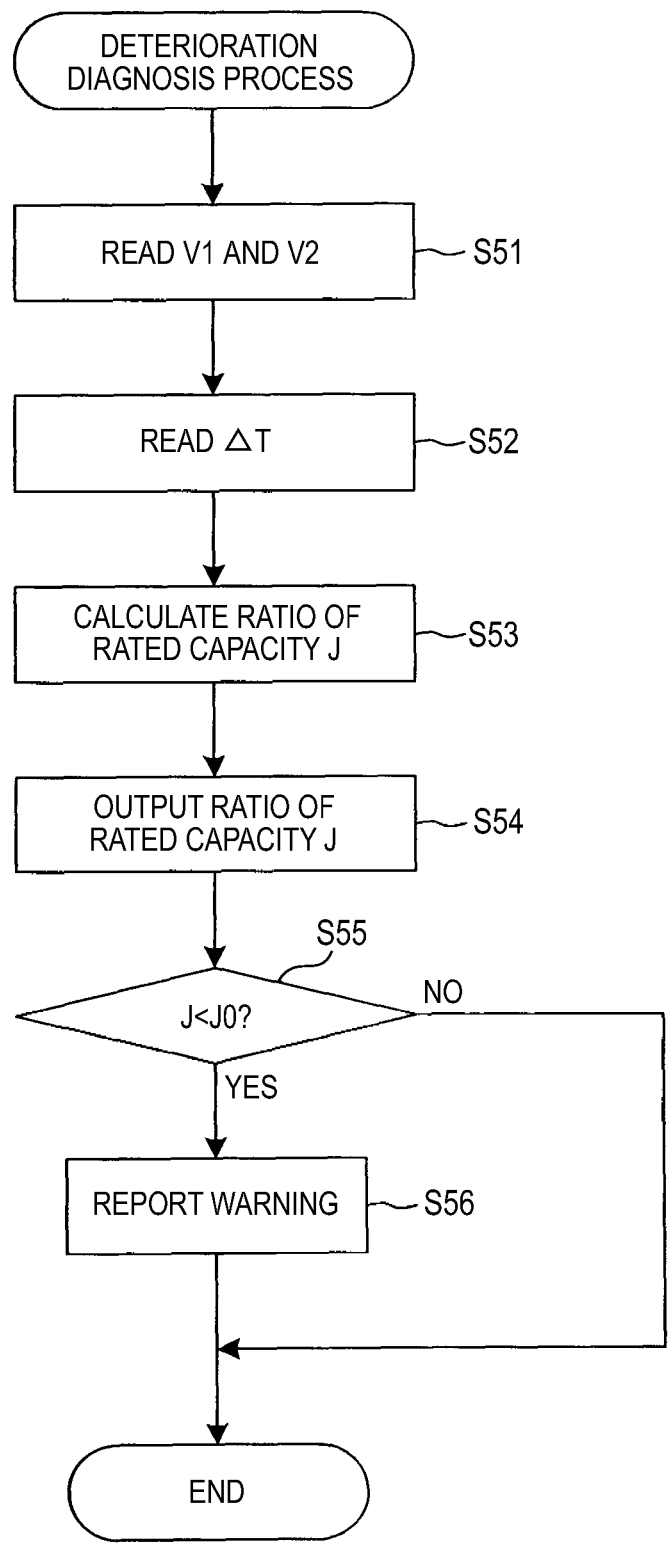
FIG. 8 is a flow chart illustrating a deterioration diagnosis processing routine executed by a deterioration diagnosis unit of the door control apparatus.

FIG. 8 is a flow chart illustrating a deterioration diagnosis processing routine executed by the deterioration diagnosis unit 44 of the door control apparatus 40. When the charge finish signal D is input to the deterioration diagnosis unit 44, the deterioration diagnosis processing routine is initiated. When the routine is initiated, first, the deterioration diagnosis unit 44 reads the input charge start voltage V1 and the input charge finish voltage V2 (S51), and then reads an input period of charge time ΔT (S52). Subsequently, the deterioration diagnosis unit 44 calculates a ratio of rated capacity J based on the charge start voltage V1, the charge finish voltage V2, and the period of charge time ΔT which are read. The ratio of rated capacity is a ratio of current capacity of the door built-in energy storage device 50 to the intrinsic rated capacity thereof. Typically, when deterioration of an energy storage device makes progress, a ratio of rated capacity becomes small.

The deterioration diagnosis unit 44 calculates the ratio of rated capacity J in S53, and then outputs the calculated ratio of rated capacity J to the charge speed control unit 45 (S54). The charge speed control unit 45 stores the input ratio of rated capacity J. When the charge speed control unit 45 already stores a ratio of rated capacity which is previously input, the charge speed control unit 45 updates the stored ratio of rated capacity J by overwriting the ratio of rated capacity. Accordingly, the charge speed control unit 45 stores the latest ratio of rated capacity J every time.

Subsequently, the deterioration diagnosis unit 44 determines whether the ratio of rated capacity J calculated in S53 is less than a ratio of reference rated capacity J0 (S55). The ratio of reference rated capacity J0 is determined in advance as a ratio of rated capacity which indicates that deterioration of the door built-in energy storage device 50 makes progress. When it is determined that the ratio of rated capacity J is greater than or equal to the ratio of reference rated capacity J0 (S55: No), the deterioration diagnosis unit 44 finishes the routine. In contrast, when it is determined that the ratio of rated capacity J is less than the ratio of reference rated capacity J0 (S55: Yes), the deterioration diagnosis unit 44 transfers the process to S56, and reports to an occupant an alarm that deterioration of the door built-in energy storage device 50 makes considerable progress by turning on a deterioration state indication lamp or the like which is provided in a cabin of the vehicle. Accordingly, the replacement of the door built-in energy storage device 50 is encouraged. Thereafter, the deterioration diagnosis unit 44 finishes the routine. The deterioration diagnosis unit 44 executes the deterioration diagnosis processing routine, and reports to the occupant in the vehicle that the door built-in energy storage device 50 is diagnosed for deterioration, and the fact when the deterioration makes progress.

Figure 9:
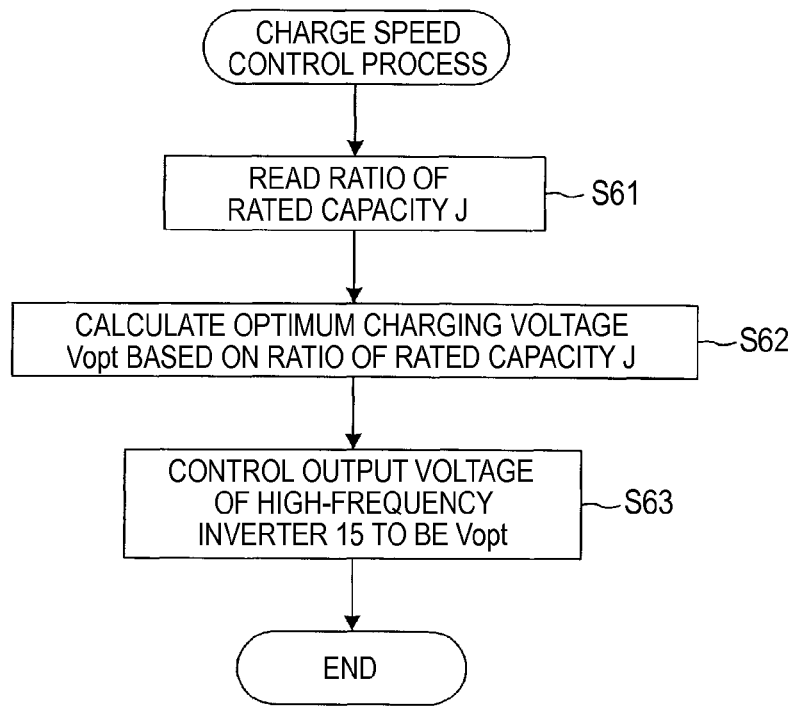
FIG. 9 is a flow chart illustrating a charge speed control processing routine executed by a charge speed control unit of the door control apparatus.

FIG. 9 is a flow chart illustrating a charge speed control processing routine executed by the charge speed control unit 45 of the door control apparatus 40. When the charge start signal C is input to the charge speed control unit 45 from the charge start processing unit 42, the routine is executed. When the charge speed control processing routine is initiated, first, the charge speed control unit 45 reads the stored ratio of rated capacity J in S61 illustrated in FIG. 9. Subsequently, the charge speed control unit 45 calculates an optimum charge voltage Vopt based on the read ratio of rated capacity J (S62). Typically, when deterioration of an energy storage device makes progress (when the ratio of rated capacity J is small), it is possible to further increase the amount of charge by decreasing a charge current (a transmitted current) and a charge speed. The charge speed control unit 45 calculates the optimum charge voltage Vopt based on this fact. The charge speed control unit 45 calculates the optimum charge voltage Vopt in such a manner that the optimum charge voltage Vopt is decreased to the extent that the ratio of rated capacity J is small.

The charge speed control unit 45 calculates the optimum charge voltage Vopt, and then controls the high-frequency inverter 15 in order for the high-frequency inverter 15 to output the optimum charge voltage Vopt (S63). As illustrated in FIG. 3, a communication unit 81 is connected to the door control apparatus 40, and the charge speed control unit 45 controls the high-frequency inverter 15 installed on the vehicle body via the communication unit 81. Thereafter, the charge speed control unit 45 finishes the routine. The charge speed control unit 45 executes the charge speed control process in this manner, and thus controls a charge speed of the door built-in energy storage device 50 to a charge speed which is in correlation with degree of progress of deterioration. That is, the charge speed is decreased to the extent that the deterioration of the door built-in energy storage device 50 makes progress. For this reason, it is possible to efficiently and satisfactorily charge the door built-in energy storage device 50.

Figure 10:
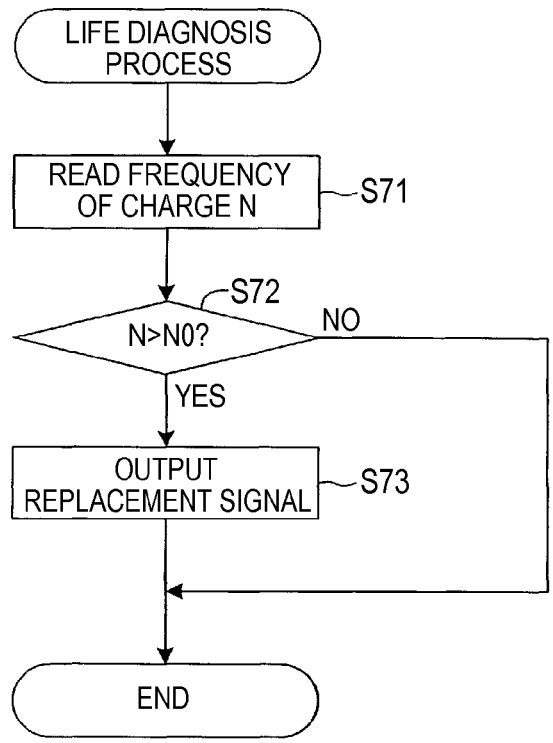
FIG. 10 is a flow chart illustrating a life diagnosis processing routine executed by a life diagnosis unit of the door control apparatus.

FIG. 10 is a flow chart illustrating a life diagnosis processing routine executed by the life diagnosis unit 46 of the door control apparatus 40. When the frequency of charge N is input to the life diagnosis unit 46 from the charge control unit 43, the routine is initiated. When the life diagnosis processing routine is initiated, first, the life diagnosis unit 46 reads the frequency of charge N input from the charge control unit 43 in S71 illustrated in FIG. 10, and then determines whether the read frequency of charge N is greater than an upper frequency limit N0 (S72). The upper frequency limit N0 is preset as an upper limit value of the frequency of charge, for which reliability of the door built-in energy storage device 50 can be compensated. When it is determined that the frequency of charge N is less than or equal to the upper frequency limit N0 in S72 (S72: No), the life diagnosis unit 46 finishes the routine. In contrast, when it is determined that the frequency of charge N is greater than the upper frequency limit N0 (S72: Yes), the life diagnosis unit 46 outputs a replacement signal (S73). For example, when the life diagnosis unit 46 receives the replacement signal, the life diagnosis unit 46 turns on a replacement lamp provided in the cabin of the vehicle, and reports to the occupant in the vehicle that the replacement of the door built-in energy storage device 50 is required. Thereafter, the life diagnosis unit 46 finishes the routine. The life diagnosis unit 46 executes the life diagnosis processing routine, and thus encourages the occupant to replace the door built-in energy storage device 50 when the frequency of charging of the door built-in energy storage device 50 exceeds the specified frequency of charge (the upper frequency limit) N0.

Subsequently, the following brief description is relative to the control of the sliding door driving unit 30 by the sliding door driving control unit 48 of the door control apparatus 40. When a door handle attached to the sliding door 21 is operated so as to open the sliding door 21 at the fully closed position or an intermediate position (a position between the fully closed position and the fully open position), the sliding door driving control unit 48 outputs an ON signal to the second relay 72, and controls electric energization of the electric motor 31 in such a manner that the electric motor 31 rotates in one direction. Accordingly, electric power discharged from the door built-in energy storage device 50 is supplied to the electric motor 31 via the inverter 63, and the electric motor 31 rotates in one direction. As a result, the sliding door driving unit 30 connected to the electric motor 31 is driven, the sliding door 21 slides toward the rear of the vehicle, and the sliding door 21 is opened. When the sliding door 21 slides to the fully open position, the sliding door driving control unit 48 outputs an OFF signal to the second relay 72. Accordingly, the door built-in energy storage device 50 shuts off the supply of electric power to the electric motor 31, and the sliding of the sliding door 21 is stopped.

In contrast, when the door handle is operated so as to close the sliding door 21 at the fully open position or an intermediate position, the sliding door driving control unit 48 outputs an ON signal to the second relay 72, and controls electric energization of the electric motor 31 in such a manner that the electric motor 31 rotates in the other direction. Accordingly, electric power discharged from the door built-in energy storage device 50 is supplied to the electric motor 31 via the inverter 63, and the electric motor 31 rotates in the other direction. As a result, the sliding door driving unit 30 connected to the electric motor 31 is driven, the sliding door 21 slides toward the front of the vehicle, and the sliding door 21 is closed. When the sliding door 21 slides to the fully closed position, the sliding door driving control unit 48 outputs an OFF signal to the second relay 72. Accordingly, the door built-in energy storage device 50 shuts off the supply of electric power to the electric motor 31, and the sliding of the sliding door 21 is stopped.

As described above, in the electric sliding door apparatus 20 of the embodiment, the sliding door driving unit 30 is driven by electric power discharged from the door built-in energy storage device 50. The door built-in energy storage device 50 is configured in such a manner that the door built-in energy storage device 50 can be inductively charged with electric power of the in-vehicle energy storage device 14.

Second Embodiment

Subsequently, Second Embodiment will be described. The electric sliding door apparatus according to the embodiment is basically the same as the electric sliding door apparatus described in First Embodiment except that the electric power transmitting coil and the electric power receiving coil are attached at positions different from those in First Embodiment, and an auxiliary electric power receiving coil is provided.

Figure 11:
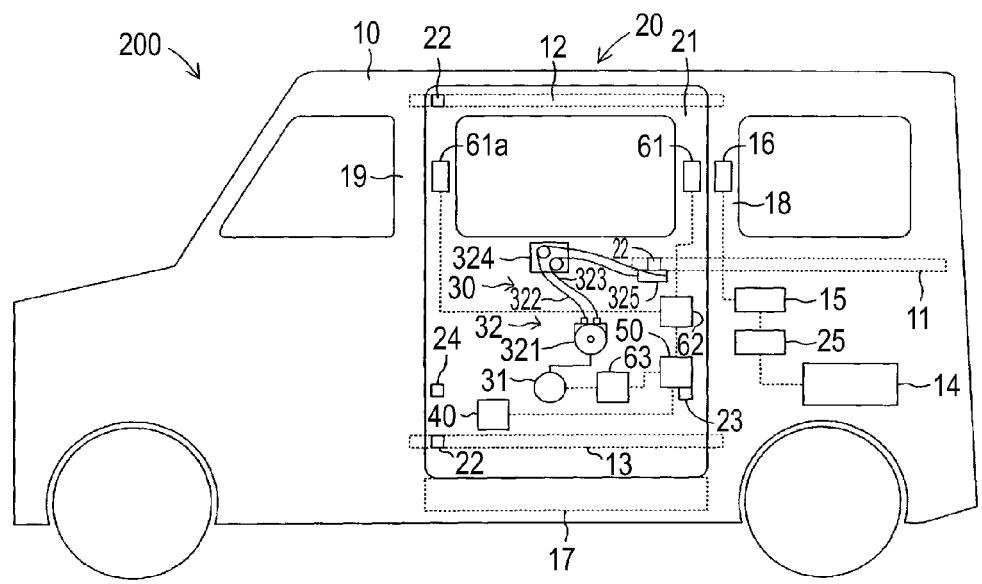
FIG. 11 is a schematic side view of a vehicle equipped with an electric sliding door apparatus according to Second Embodiment.
Figure 12:
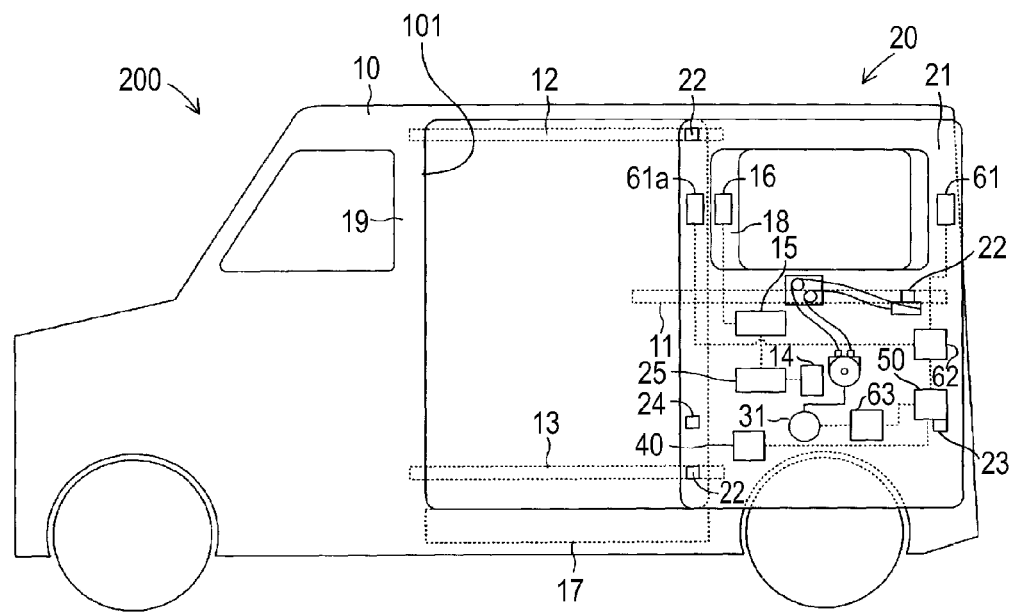
FIG. 12 is another schematic side view of the vehicle equipped with the electric sliding door apparatus according to Second Embodiment.

FIGS. 11 and 12 are schematic side views of a vehicle equipped with the electric sliding door apparatus according to the embodiment. A vehicle 200 includes the vehicle body 10 and the electric sliding door apparatus 20. The electric sliding door apparatus 20 is configured to include the sliding door 21; the sliding door driving unit 30; the door control apparatus 40; the door built-in energy storage device 50; the electric power receiving coil 61; and an auxiliary electric power receiving coil 61a. FIG. 11 illustrates a state where the sliding door 21 is fully closed, and FIG. 12 illustrates a state where the sliding door 21 is fully open.

In the embodiment, the electric power transmitting coil 16 provided on the vehicle body 10 is provided in the C pillar 18 that forms a part of the rear edge of the door opening 101 in the vehicle. In the embodiment, the electric power receiving coil 61 attached to the sliding door 21 is attached to the inner rear portion of the sliding door 21 in the vehicle. Furthermore, in the embodiment, the auxiliary electric power receiving coil 61a is attached to the inner front portion of the sliding door 21 in the vehicle. As illustrated in FIG. 11, when the sliding door 21 is fully closed, an attachment position of the electric power receiving coil 61 is determined in order for the electric power receiving coil 61 to face the electric power transmitting coil 16. As illustrated in FIG. 12, when the sliding door 21 is fully open, an attachment position of the auxiliary electric power receiving coil 61a is determined in order for the auxiliary electric power receiving coil 61a to face the electric power transmitting coil 16. Similar to the electric power receiving coil 61, the auxiliary electric power receiving coil 61a is electrically connected to the rectifier 62. Second Embodiment has the same configurations as those described in First Embodiment except for the aforementioned configurations. Accordingly, the same reference signs will be assigned to the same configurations, and the descriptions thereof will be omitted.

Similarly to in First Embodiment, the door control apparatus 40 of the embodiment has the charge request processing unit 41, the charge start processing unit 42, the charge control unit 43, the deterioration diagnosis unit 44, the charge speed control unit 45, the life diagnosis unit 46, and the sliding door driving control unit 48. Accordingly, the block diagram illustrated in FIG. 4 relative to the configuration of First Embodiment may be used as a functional diagram of the door control apparatus 40 of Second Embodiment. Since a description of a process executed by each unit is the same as that described in First Embodiment except for the description of the charge start processing unit 42, the detailed descriptions thereof will be omitted.

Figure 13:
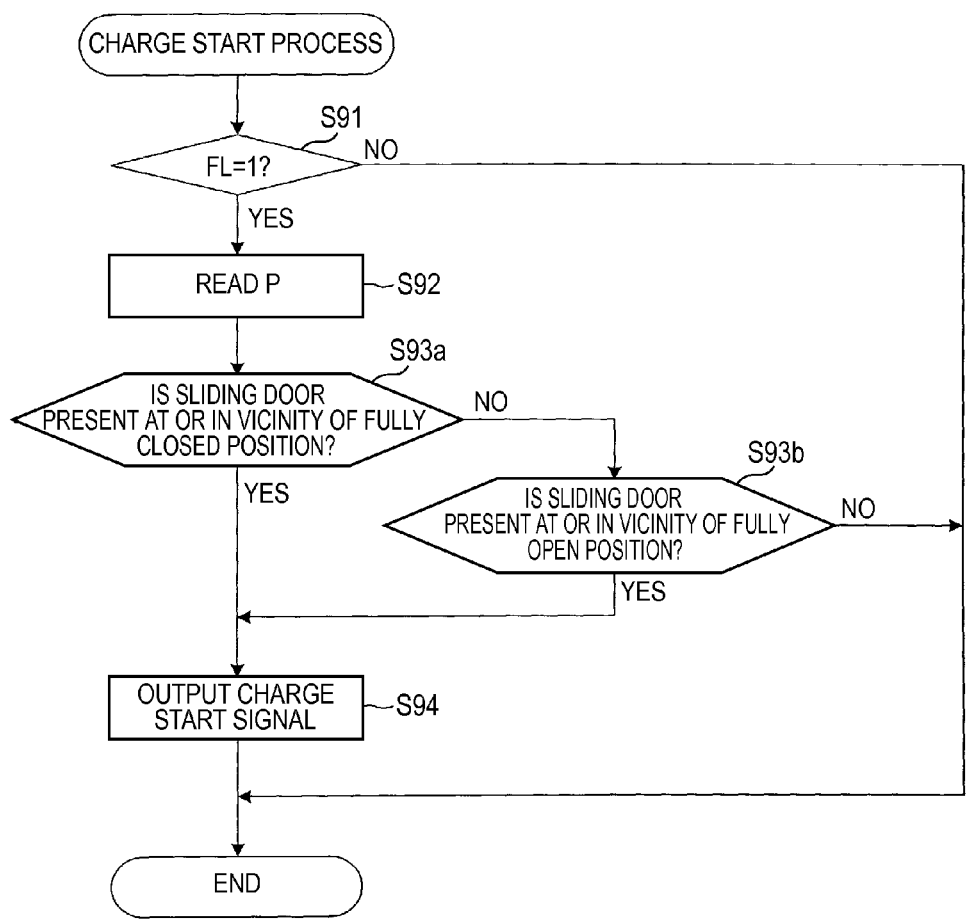
FIG. 13 is a flow chart illustrating a charge start processing routine executed by a charge start processing unit according to Second Embodiment.

FIG. 13 is a flow chart illustrating a charge start processing routine executed by the charge start processing unit 42 according to the embodiment. When the routine is initiated, first, the charge start processing unit 42 determines whether the charge request flag FL input from the charge request processing unit 41 is set to 1 in S91 illustrated in FIG. 13. When the charge request flag FL is set to 0 (S91: No), the charge start processing unit 42 finishes the routine. In contrast, when the charge request flag FL is set to 1 (S91: Yes), the charge start processing unit 42 transfers the process to S92, and reads the position information P of the sliding door 21 which is input from the position detection sensor 24. Subsequently, the charge start processing unit 42 determines whether the sliding door 21 is present at or in the vicinity of the fully closed position based on the read position information P (S93a). When the sliding door 21 is present at or in the vicinity of the fully closed position (S93a: Yes), the charge start processing unit 42 transfers the process to S94. In contrast, when the sliding door 21 is not present at or in the vicinity of the fully closed position (S93a: No), the charge start processing unit 42 transfers the process to S93b, and determines whether the sliding door 21 is present at or in the vicinity of the fully open position based on the position information P. For example, a "position in the vicinity of the fully open position" is a position between the fully open position and a half-open door position (for example, a position at which a half latch hook of the fully-open door lock apparatus is engaged with the ratchet). When the sliding door 21 is not present at or in the vicinity of the fully open position (S93b: No), the charge start processing unit 42 finishes the routine. In contrast, when the sliding door 21 is present at or in the vicinity of the fully open position (S93b: Yes), the charge start processing unit 42 transfers the process to S94. In S94, the charge start processing unit 42 outputs the charge start signal C to the charge control unit 43 and the charge speed control unit 45. Thereafter, the charge start processing unit 42 finishes the routine. Since the charge start processing routine is executed, the charge request flag FL is set to 1. In addition, when the sliding door 21 is present at or in the vicinity of the fully closed position, or when the sliding door 21 is present at or in the vicinity of the fully open position, the charge start processing unit 42 outputs the charge start signal C to the charge control unit 43 and the charge speed control unit 45.

When the sliding door 21 is present at or in the vicinity of the fully closed position, the electric power receiving coil 61 faces the electric power transmitting coil 16. Accordingly, electric power from the in-vehicle energy storage device 14 is supplied to the door built-in energy storage device 50 via the electric power receiving coil 61. That is, when the door built-in energy storage device 50 is charged, and the sliding door 21 is present at or in the vicinity of the fully closed position, the door built-in energy storage device 50 is inductively charged via the electric power receiving coil 61. In contrast, when the sliding door 21 is present at or in the vicinity of the fully open position, the auxiliary electric power receiving coil 61a faces the electric power transmitting coil 16. Accordingly, electric power from the in-vehicle energy storage device 14 is supplied to the door built-in energy storage device 50 via the auxiliary electric power receiving coil 61a. That is, when the door built-in energy storage device 50 is charged, and the sliding door 21 is present at or in the vicinity of the fully open position, the door built-in energy storage device 50 is inductively charged via the auxiliary electric power receiving coil 61a.

As described above, the electric sliding door apparatus 20 (the opening and closing apparatus) according to First Embodiment and Second Embodiment is configured to include the sliding door (the opening and closing body) 21 that is supported by the vehicle body 10 (the main body) so as to be slidable in the longitudinal direction of the vehicle, and is attached to the vehicle body 10 so as to be capable of opening and closing the door opening 101 which is formed in the vehicle body 10; the sliding door driving unit (the drive unit) 30 that is provided in the sliding door 21, and drives and slides (opens and closes) the sliding door 21 relative to the vehicle body 10 using electric power; the door built-in energy storage device (the secondary energy storage device) 50 that is provided in the sliding door 21, can be inductively charged, and is electrically connected to the sliding door driving unit 30 so as to be capable of supplying electric power to the sliding door driving unit 30; and the electric power receiving coil 61 that is provided in the sliding door 21 so as to be capable of facing the electric power transmitting coil 16 which is provided on the vehicle body 10 and is electrically connected to the in-vehicle energy storage device 14 (the primary energy storage device) mounted on the vehicle body 10, and that is electrically connected to the door built-in energy storage device 50.

The electric sliding door apparatus 20 according to First Embodiment and Second Embodiment includes the door control apparatus 40 (the charge control unit 43) that controls charging of the door built-in energy storage device in such a manner that the door built-in energy storage device 50 is inductively charged with electric power of the in-vehicle energy storage device 14 via the electric power transmitting coil 16 and the electric power receiving coil 61 when the electric power transmitting coil 16 faces the electric power receiving coil 61.

In the electric sliding door apparatus 20 according to First Embodiment and Second Embodiment, the door built-in energy storage device 50 installed in the sliding door 21 supplies electric power so as to drive the sliding door driving unit 30 in the sliding door 21, and thus it is not necessary to provide a cable between the vehicle body 10 and the sliding door 21 so as to supply electric power to the sliding door driving unit 30. Furthermore, since the door built-in energy storage device 50 is inductively charged with electric power from the in-vehicle energy storage device 14, it is not necessary to provide a cable between the vehicle body 10 and the sliding door 21 so as to charge the door built-in energy storage device 50. Accordingly, the electric sliding door apparatus can solve the problem occurring when the vehicle body 10 is connected to the sliding door 21 via a cable.

According to First Embodiment, the electric power transmitting coil 16 is provided in the foot panel 17 that is part of the vehicle body 10 and is provided directly below the door opening 101. When the sliding door 21 is fully closed, the electric power receiving coil 61 is provided in the inner lower portion of the sliding door 21 so as to face the electric power transmitting coil 16. Accordingly, when the sliding door 21 is fully closed, the electric power receiving coil 61 faces the electric power transmitting coil 16 in the foot panel 17, and the door built-in energy storage device 50 can be inductively charged. The foot panel 17 among the components of the vehicle body 10 does not require relatively high strength against an impact. Accordingly, it is possible to install the electric power transmitting coil 16 on the vehicle body 10 while still maintaining the strength performance demanded by the vehicle.

According to First Embodiment and Second Embodiment, the sliding door 21 is slidably attached to the vehicle body 10 in such a manner that an open and closed state of the door opening 101 changes from a fully closed state to a fully open state when the sliding door 21 moves in a sliding manner toward the rear of the vehicle relative to the vehicle body 10. According to Second Embodiment, the electric power transmitting coil 16 is provided in the C pillar 18 that is part of the vehicle body 10, and that forms a part of the rear edge of the door opening 101 in the vehicle. When the sliding door 21 is fully closed, the electric power receiving coil 61 is provided in the inner rear portion of the sliding door 21 in the vehicle so as to face the electric power transmitting coil 16. Accordingly, when the sliding door is fully closed, the electric power transmitting coil 16 installed in the C pillar 18 faces the electric power receiving coil 61, and the door built-in energy storage device 50 can be inductively charged.

According to Second Embodiment, the electric sliding door apparatus 20 includes the auxiliary electric power receiving coil 61a that is provided in the inner front portion of the sliding door 21 in the vehicle so as to face the electric power transmitting coil 16 in the C pillar 18 when the sliding door 21 is fully open. Accordingly, when the sliding door is fully open, the auxiliary electric power receiving coil 61a faces the electric power transmitting coil 16 in the C pillar 18, and the door built-in energy storage device 50 can be inductively charged.

The embodiments disclosed here are described above, but the present disclosure is not limited to the aforementioned embodiments. For example, Second Embodiment illustrates the example in which the electric power transmitting coil 16 is attached to the C pillar 18 that forms a part of the rear edge of the door opening 101 in the vehicle. However, the electric power transmitting coil 16 may be attached to the B pillar 19 that forms a part of the front edge of the door opening 101 in the vehicle. In this case, the electric power receiving coil 61 is preferably attached to the front of the sliding door 21 in the vehicle. First Embodiment is configured to finish the charge start processing routine when a determination in S23 is No. However, when a determination in S23 is No, the embodiment may be configured to output a charge stop signal to the charge control unit, and afterward to finish the routine. When the charge control unit receives a charge stop signal while controlling the charging of the door built-in energy storage device 50, the charge control unit may be configured to stop the charge. Accordingly, for example, it is possible to suppress wasteful discharge of the in-vehicle energy storage device 14 by stopping the charge when the sliding door 21 is operated to be open while the door built-in energy storage device 50 is being charged.

The present disclosure is applicable to a back door. In particular, the present disclosure is applicable to the back door (a power back door) that is electrically openable and closeable. Specifically, a back door driving unit is provided in the back door so as to open and close the back door, and a door built-in energy storage device is provided in the back door so as to supply electric power to the back door driving unit. When the back door is fully closed, a configuration may be adopted in which the door built-in energy storage device is inductively charged with electric power of the in-vehicle energy storage device. In addition, the present disclosure is applicable to the opening and closing body that is openably and closeably attached to the main body. As such, the present disclosure can be appropriately modified and applied in various forms insofar as the modifications and applications do not depart from the scope of the present disclosure.

An aspect of this disclosure is directed to an opening and closing apparatus including: a drive unit that is provided in an opening and closing body which is openably and closeably attached to a main body, and that opens and closes the opening and closing body with respect to the main body by driving the opening and closing body using electric power; a secondary energy storage device that is provided in the opening and closing body and is electrically connected to the drive unit in such a manner that the secondary energy storage device can be inductively charged and can supply electric power to the drive unit; and an electric power receiving coil that is provided in the opening and closing body so as to be capable of facing an electric power transmitting coil which is provided on the main body, and is electrically connected to a primary energy storage device installed on the main body, and that is electrically connected to the secondary energy storage device. In this case, the opening and closing apparatus according to the aspect of this disclosure preferably includes a control apparatus which controls the secondary energy storage device in such a manner that the secondary energy storage device is inductively charged with electric power of the primary energy storage device via the electric power transmitting coil and the electric power receiving coil when the electric power transmitting coil faces the electric power receiving coil.

According to the aspect of this disclosure, the opening and closing apparatus is configured in such a manner that the secondary energy storage device in the opening and closing body is inductively charged with electric power from the primary energy storage device when the electric power transmitting coil, which is electrically connected to the primary energy storage device disposed on the main body, faces the electric power receiving coil disposed on the opening and closing body. Accordingly, electric power of the secondary energy storage device is supplied to the drive unit provided in the opening and closing body to thereby drive the opening and closing body.

That is, according to the aspect of this disclosure, the drive unit in the opening and closing body is driven by electric power from the secondary energy storage device installed in the opening and closing body, and thus it is not necessary to provide a cable between the main body and the opening and closing body so as to supply electric power to the drive unit. Furthermore, since the secondary energy storage device is inductively charged with electric power from the primary energy storage device, it is not necessary to provide a cable between the main body and the opening and closing body so as to charge the secondary energy storage device. Accordingly, it is possible to provide the opening and closing apparatus that can solve problems occurring when the main body is connected to the opening and closing body via a cable. Furthermore, according to this configuration, it is possible to manufacture and sell the opening and closing apparatus in which the opening and closing body, the drive unit, and the secondary energy storage device are integrated together.

According to the aspect of this disclosure, since the secondary energy storage device is inductively charged when the electric power transmitting coil of the main body faces the electric power receiving coil of the opening and closing body, it is necessary to provide both coils at respective positions in which both coils can face each other. In this case, when the opening and closing body is fully closed, the electric power transmitting coil may be provided so as to face the electric power receiving coil. Accordingly, when the opening and closing body is present at or in the vicinity of a fully closed position, the secondary energy storage device can be inductively charged.

The main body may be a vehicle body, and the opening and closing body may be a vehicle door that is openably and closeably attached to the vehicle body. Accordingly, it is possible to provide a vehicle door apparatus that can solve the problem occurring when the vehicle body is connected to the vehicle door via a cable.

The opening and closing body may be a sliding door that is supported by the vehicle body so as to be slidable in a longitudinal direction of a vehicle, and that can open and close a door opening which is formed in the vehicle body. The electric power transmitting coil may be provided in a foot panel that is part of the vehicle body, and that is provided directly below the door opening. When the sliding door is fully closed, the electric power receiving coil may be provided in an inner lower portion of the sliding door so as to face the electric power transmitting coil. Accordingly, when the sliding door is fully closed, the electric power transmitting coil installed in the foot panel which is positioned below the sliding door faces the electric power receiving coil installed in the inner lower portion of the sliding door. For this reason, when the sliding door is present at or in the vicinity of the fully closed position, the door built-in energy storage device can be inductively charged. The foot panel among components of the vehicle body does not require relatively high strength against an impact. Accordingly, it is possible to install the electric power transmitting coil on the vehicle body while still maintaining the strength performance demanded by the vehicle.

The sliding door may be slidably attached to the vehicle body in such a manner that an open and closed state of the door opening changes from a fully closed state to a fully open state when the sliding door moves in a sliding manner toward a rear of the vehicle relative to the vehicle body. The electric power transmitting coil may be provided in a pillar that is part of the vehicle body, and that forms a part of a rear edge of the door opening in the vehicle. In this case, when the sliding door is fully closed, the electric power receiving coil may be provided in an inner rear portion of the sliding door in the vehicle so as to face the electric power transmitting coil. Accordingly, when the sliding door is fully closed, a pillar (for example, a C pillar) of the vehicle body, which forms a part of the rear edge of the door opening in the vehicle, is positioned in back of the sliding door in the vehicle. For this reason, the electric power transmitting coil installed in the pillar faces the electric power receiving coil installed in the inner rear portion of the sliding door in the vehicle. Accordingly, when the sliding door is present at or in the vicinity of the fully closed position, the door built-in energy storage device can be inductively charged.

In this case, the opening and closing apparatus according to the aspect of the present disclosure may further include an auxiliary electric power receiving coil that is electrically connected to the door built-in energy storage device, and is provided in an inner front portion of the sliding door in the vehicle so as to face the electric power transmitting coil when the sliding door is fully open. Accordingly, when the sliding door is fully open, the auxiliary electric power receiving coil installed in the inner front portion of the sliding door in the vehicle faces the electric power transmitting coil installed in the pillar (for example, the C pillar) of the vehicle body, which forms a part of the rear edge of the door opening in the vehicle. Accordingly, when the sliding door is present at or in the vicinity of the fully open position, the door built-in energy storage device can be inductively charged.

The vehicle door may be a sliding door that is supported by the vehicle body so as to be slidable in a longitudinal direction of a vehicle, and that is configured so as to be capable of opening and closing a door opening which is formed in the vehicle body. The sliding door may be slidably attached to the vehicle body in such a manner that an open and closed state of the door opening changes from a fully closed state to a fully open state when the sliding door moves in a sliding manner toward a rear of the vehicle relative to the vehicle body. The electric power transmitting coil may be provided in a pillar that is part of the vehicle body, and that forms a part of a rear edge of the door opening in the vehicle. When the sliding door is fully closed, the electric power receiving coil may be provided in an inner rear portion of the sliding door in the vehicle so as to face the electric power transmitting coil.

Another aspect of this disclosure is directed to a opening and closing apparatus including: a drive unit that is configured to be provided in an opening and closing body which is openably and closeably attached to a main body, and that is configured to open and close the opening and closing body with respect to the main body by driving the opening and closing body using electric power; a secondary energy storage device that is configured to be provided in the opening and closing body and that is electrically connected to the drive unit in such a manner that the secondary energy storage device can be inductively charged and can supply electric power to the drive unit; and an electric power receiving coil that is provided in the opening and closing body so as to be capable of facing an electric power transmitting coil which is configured to be provided on the main body and be electrically connected to a primary energy storage device configured to be installed on the main body, and that is electrically connected to the secondary energy storage device.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening and closing apparatus comprising:
    a drive unit that is provided in an opening and closing body which is openably and closeably attached to a main body, and that opens and closes the opening and closing body with respect to the main body by driving the opening and closing body using electric power;
    a secondary energy storage device that is provided in the opening and closing body and is electrically connected to the drive unit in such a manner that the secondary energy storage device can be inductively charged and can supply electric power to the drive unit; and
    an electric power receiving coil that is provided in the opening and closing body so as to be capable of facing an electric power transmitting coil which is provided on the main body, and is electrically connected to a primary energy storage device installed on the main body, and that is electrically connected to the secondary energy storage device.

2. The opening and closing apparatus according to claim 1, wherein when the opening and closing body is fully closed, the electric power receiving coil is provided at a position at which the electric power receiving coil faces the electric power transmitting coil.

3. The opening and closing apparatus according to claim 1, wherein the main body is a vehicle body, and
    wherein the opening and closing body is a vehicle door that is openably and closeably attached to the vehicle body.

4. The opening and closing apparatus according to claim 3, wherein the vehicle door is a sliding door that is supported by the vehicle body so as to be slidable in a longitudinal direction of a vehicle, and that can open and close a door opening which is formed in the vehicle body,
    wherein the electric power transmitting coil is provided in a foot panel that is part of the vehicle body, and that is provided directly below the door opening, and
    wherein when the sliding door is fully closed, the electric power receiving coil is provided in an inner lower portion of the sliding door so as to face the electric power transmitting coil.

5. The opening and closing apparatus according to claim 4, wherein the sliding door is slidably attached to the vehicle body in such a manner that an open and closed state of the door opening changes from a fully closed state to a fully open state when the sliding door moves in a sliding manner toward a rear of the vehicle relative to the vehicle body,
    wherein the electric power transmitting coil is provided in a pillar that is part of the vehicle body, and that forms a part of a rear edge of the door opening in the vehicle, and
    wherein when the sliding door is fully closed, the electric power receiving coil is provided in an inner rear portion of the sliding door in the vehicle so at to face the electric power transmitting coil.

6. The opening and closing apparatus according to claim 5, further comprising:
    an auxiliary electric power receiving coil that is electrically connected to the secondary energy storage device, and is provided in an inner front portion of the sliding door in the vehicle so as to face the electric power transmitting coil when the sliding door is fully open.

7. The opening and closing apparatus according to claim 3, wherein the vehicle door is a sliding door that is supported by the vehicle body so as to be slidable in a longitudinal direction of a vehicle, and that is configured so as to be capable of opening and closing a door opening which is formed in the vehicle body,
    wherein the sliding door is slidably attached to the vehicle body in such a manner that an open and closed state of the door opening changes from a fully closed state to a fully open state when the sliding door moves in a sliding manner toward a rear of the vehicle relative to the vehicle body,
    wherein the electric power transmitting coil is provided in a pillar that is part of the vehicle body, and that forms a part of a rear edge of the door opening in the vehicle, and
    wherein when the sliding door is fully closed, the electric power receiving coil is provided in an inner rear portion of the sliding door in the vehicle so as to face the electric power transmitting coil.

8. The opening and closing apparatus according to claim 1, wherein the secondary energy storage device is a capacitor.

9. An opening and closing apparatus comprising:
    a drive unit that is configured to be provided in an opening and closing body which is openably and closeably attached to a main body, and that is configured to open and close the opening and closing body with respect to the main body by driving the opening and closing body using electric power;
    a secondary energy storage device that is configured to be provided in the opening and closing body and that is electrically connected to the drive unit in such a manner that the secondary energy storage device can be inductively charged and can supply electric power to the drive unit; and an electric power receiving coil that is provided in the opening and closing body so as to be capable of facing an electric power transmitting coil which is configured to be provided on the main body and be electrically connected to a primary energy storage device configured to be installed on the main body, and that is electrically connected to the secondary energy storage device.

\* \* \* \* \*